US012767040B2

(12) United States Patent
Sickler et al.

(10) Patent No.: US 12,767,040 B2
(45) **Date of Patent: *Oct. 20, 2026**

(54) CAMERA AND MOUNT FOR A VEHICLE TRAILER

(71) Applicant: HOPKINS MANUFACTURING CORPORATION, Emporia, KS (US)

(72) Inventors: Vicki Sickler, Emporia, KS (US); Damien DeLucco, Wamego, KS (US)

(73) Assignee: HOPKINS MANUFACTURING CORPORATION, Emporia, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/774,190

(22) Filed: Jul. 16, 2024

(65) Prior Publication Data

US 2024/0367579 A1 Nov. 7, 2024

Related U.S. Application Data

(63) Continuation of application No. 18/353,361, filed on Jul. 17, 2023, now Pat. No. 12,071,069, which is a continuation of application No. 16/998,735, filed on Aug. 20, 2020, now Pat. No. 11,745,645, which is a continuation-in-part of application No. 29/711,634, filed on Nov. 1, 2019, now Pat. No. Des. 914,791.

(51) Int. Cl.

| | |
|---|---|
| ***B60Q 1/22*** | (2006.01) |
| ***B60Q 1/24*** | (2006.01) |
| ***B60R 11/00*** | (2006.01) |
| ***B60R 11/04*** | (2006.01) |
| ***B60R 16/023*** | (2006.01) |
| ***G03B 17/56*** | (2021.01) |

(52) U.S. Cl.

CPC ................. *B60Q 1/22* (2013.01); *B60Q 1/24* (2013.01); *B60R 11/04* (2013.01); *B60R 16/023* (2013.01); *G03B 17/561* (2013.01); *B60R 2011/004* (2013.01); *B60R 2011/0066* (2013.01)

(58) Field of Classification Search

CPC ... B60R 11/04; B60R 16/023; B60R 2011/00; G03B 17/561

See application file for complete search history.

(56) References Cited

U.S. PATENT DOCUMENTS

2021/0253038 A1* 8/2021 Yamamoto ............ F16B 47/006

* cited by examiner

*Primary Examiner* — Minh Q Phan

(74) *Attorney, Agent, or Firm* — Haynes and Boone, LLP; Mark A. Tidwell

(57) ABSTRACT

A mount is provided for attaching a camera to a support surface of a towed vehicle. The support surface is configured for supporting a light housing and has a hole for receiving a fastener for securing the light housing to the support surface. The mount broadly comprises a flange and a bracket extending below the flange. The flange comprises a light housing hole for receiving the light housing therethrough, and a fastener hole for receiving the fastener. The bracket is configured to engage the camera.

20 Claims, 13 Drawing Sheets

CAMERA AND MOUNT FOR A VEHICLE TRAILER

RELATED APPLICATIONS

The present application is a continuation application and claims priority benefit of co-pending U.S. patent application Ser. No. 18/353,361, filed Jul. 17, 2023, and entitled "CAMERA AND MOUNT FOR A VEHICLE TRAILER," which claims priority benefit of U.S. patent application Ser. No. 16/998,735, filed Aug. 20, 2020, and entitled "CAMERA AND MOUNT FOR A VEHICLE TRAILER," which issued as U.S. Pat. No. 11,745,645 and claims priority benefit with regard to all common subject matter of U.S. Design patent application Ser. No. 29/711,634, filed Nov. 1, 2019, and entitled "WIRELESS VEHICLE-MOUNTED CAMERA", which issued as U.S. Pat. No. D914,791. The contents of all applications are hereby incorporated by reference in their entireties into the present application.

BACKGROUND

Trailers and other towed vehicles are often bulky and obstruct rearward views of drivers in towing vehicles. Additionally, trailers and other towed vehicles often carry large items that also obstruct rearward views. This makes it difficult to navigate traffic and to drive in reverse with a trailer attached.

To provide unobstructed rearward views, current solutions include installing cameras on rear ends of the trailers for capturing images of the rearward views and sending the images to displays in the cabins of the towing vehicles. However, installation of such cameras is difficult. In order to install a camera, holes are drilled in a surface of a trailer, power wires of the camera are fed to a power source, and an image feed wire must be run through the trailer and towing vehicle and into the cabin of the towing vehicle. Such installment is labor intensive and requires expertise.

Current solutions for avoiding feeding wires through trailers and towing vehicles involve installation of wireless cameras that are battery operated and send signals to wireless displays in the cabins of the vehicles. However, installing such cameras requires drilling holes in the walls of the trailers or using adhesives. Drilling holes risks damage to the trailers and adhesives do not always keep the cameras attached. Additionally, batteries of the cameras often die prematurely, so the cameras are unreliable without routine battery checks and maintenance.

The background discussion is intended to provide information related to the present invention which is not necessarily prior art.

SUMMARY

The present invention solves the above-described problems and other problems by providing a distinct advance in the art of camera mounts. More particularly, embodiments of the present invention provide systems and methods for attaching a camera to a trailer without damaging the trailer and without having to feed wire through the trailer.

A mount according to an embodiment of the present invention is provided for attaching a camera to a support surface of a trailer or other towed vehicle. The support surface is configured for supporting a light housing and has a hole for receiving a fastener for securing the light housing to the support surface. The mount broadly comprises a flange and a bracket extending below the flange. The flange comprises a light housing hole for receiving the light housing therethrough, and a fastener hole for receiving the fastener. The bracket is configured to engage the camera.

The light housing hole of the flange enables the light housing to be passed therethrough without disconnecting any wiring connected to the light housing. The hole of the light housing can then be aligned with the fastener hole of the flange to receive the fastener. The fastener can then be used to secure the light housing and mount to the support surface with the mount sandwiched between the light housing and the support surface. This prevents damage to the trailer when installing the camera and allows the camera to be wired to any wiring of the light housing and attached via the bracket.

A camera device according to another embodiment of the invention is provided for attaching to a support surface of a trailer or other towed vehicle. The support surface is configured for supporting a light housing and has a hole for receiving a fastener for securing the light housing to the support surface. The camera device comprises a flange, a bottom portion, a bracket, and a camera. The flange comprises a light housing hole for receiving the light housing therethrough, and a fastener hole for receiving the fastener. The bottom portion extends downwardly from the flange. The bracket is attached to the bottom portion, and the camera is attached to the bracket.

Another embodiment of the present invention is a method for securing a mount to a support surface of a trailer or other towed vehicle. The method comprises unsecuring a light housing from the support surface; threading the light housing and a length of light wires extending from the light housing through a light housing hole of a mount; positioning the mount against the support surface; aligning the light housing with the mount so that a hole of the light housing is coaxial with a fastener hole of the mount; and fastening a fastener through the hole of the light housing and the fastener hole to secure the light housing and mount to the support surface.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
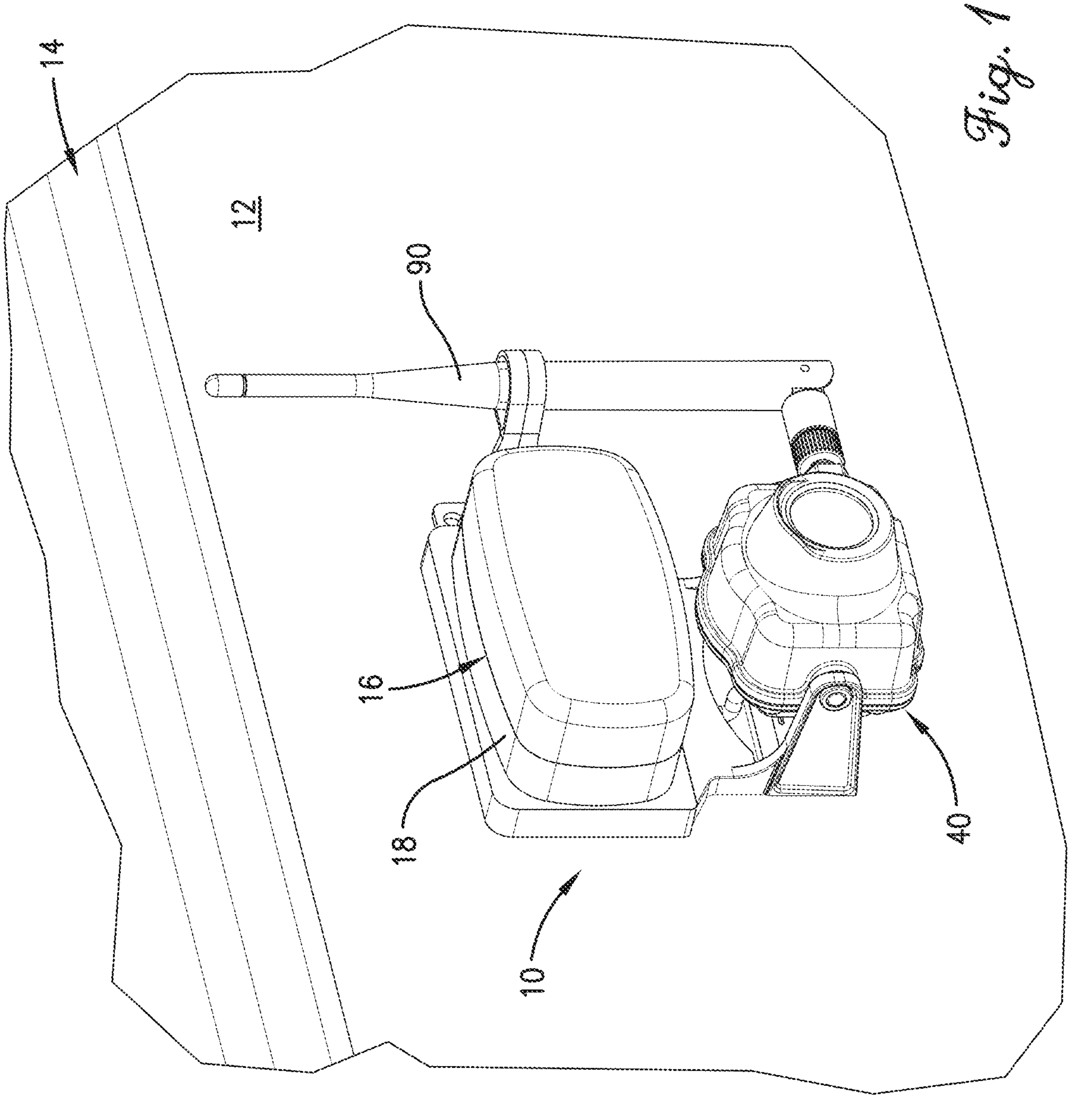
FIG. 1 is perspective view of a camera device constructed in accordance with embodiments of the present invention installed on a support surface of a trailer.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 2:
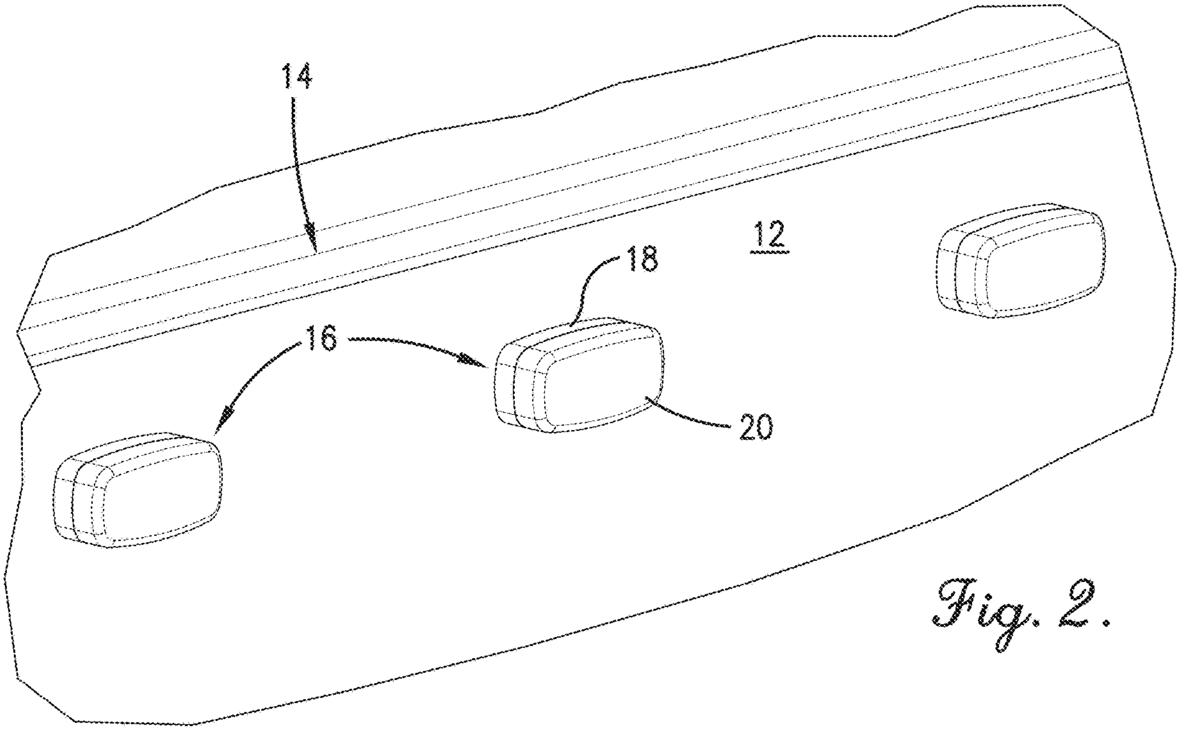
FIG. 2 is a sectional view of the support surface and a light used for installing the camera device.
Figure 3:
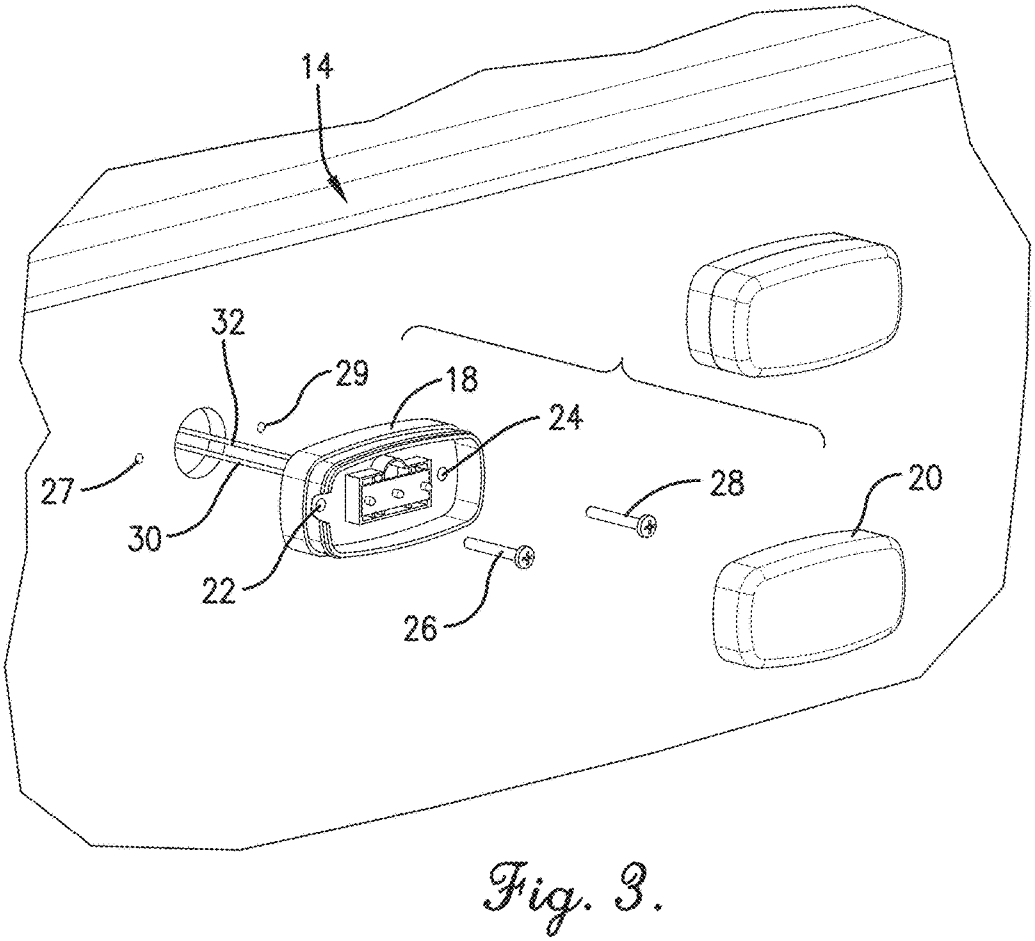
FIG. 3 is an exploded view of the light of FIG. 2.

Turning to FIG. 1, a camera device 10 constructed in accordance with an embodiment of the present invention is illustrated. The camera device 10 is configured to be attached to a support surface 12 of a trailer 14 or other towed vehicle. The support surface 12 may comprise a trailer wall, bumper, etc. and is configured for supporting a light 16 comprising a light housing 18 and a face plate 20, as depicted in FIGS. 2 and 3. The light housing 18 may be a brake light, a tail light, or the like and have one or more holes 22, 24 for receiving one or more fasteners 26, 28 for securing the light housing 18 to the support surface 12. The fasteners 26, 28 may extend into holes 27, 29 in the support surface 12. One or more wires 30, 32 may extend from inside the support surface 12 and connect to the light housing 18 and/or a light socket secured therein.

Figure 4:
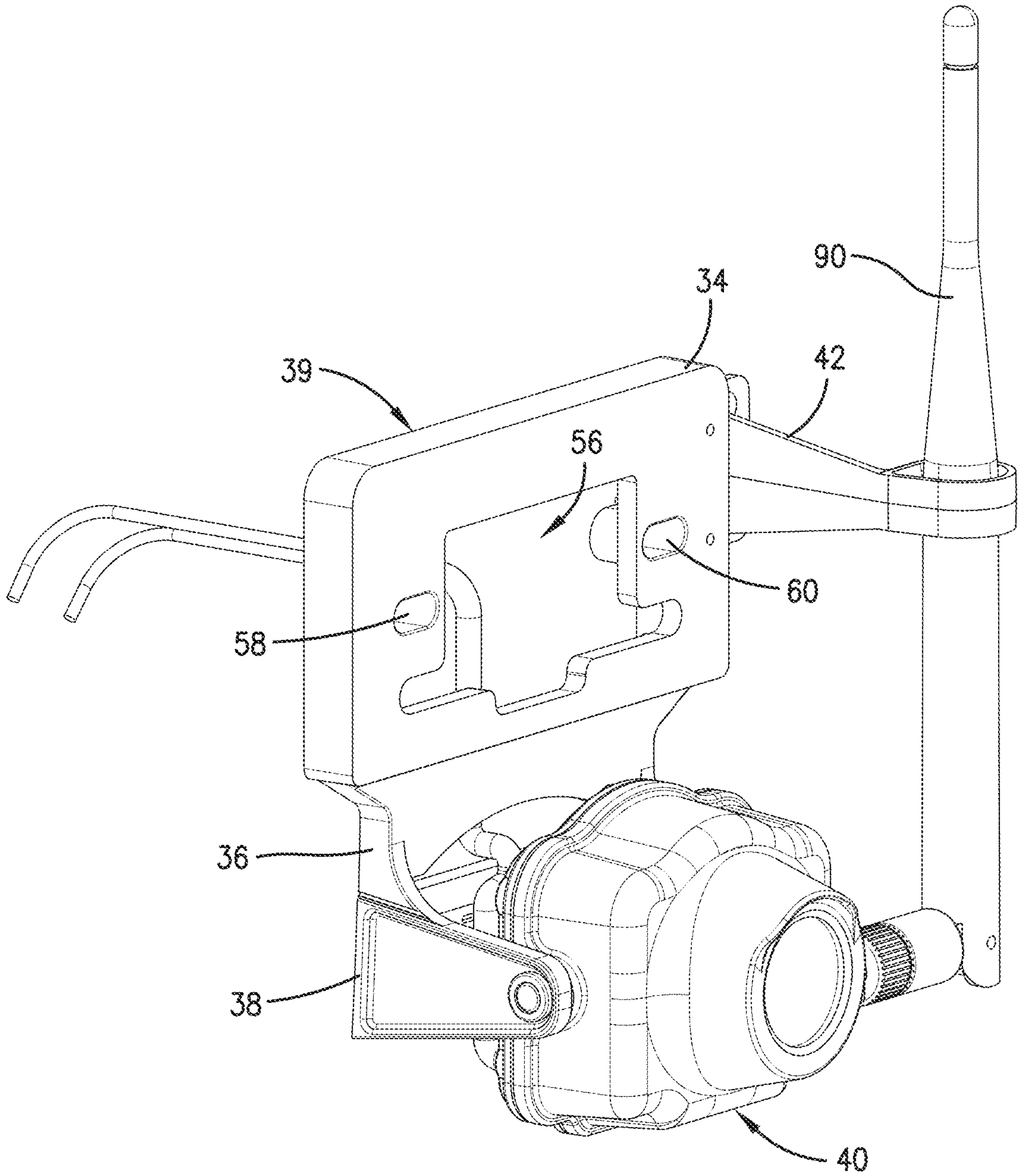
FIG. 4 is a perspective view of the camera device of FIG. 1 detached from the support surface.
Figure 5:
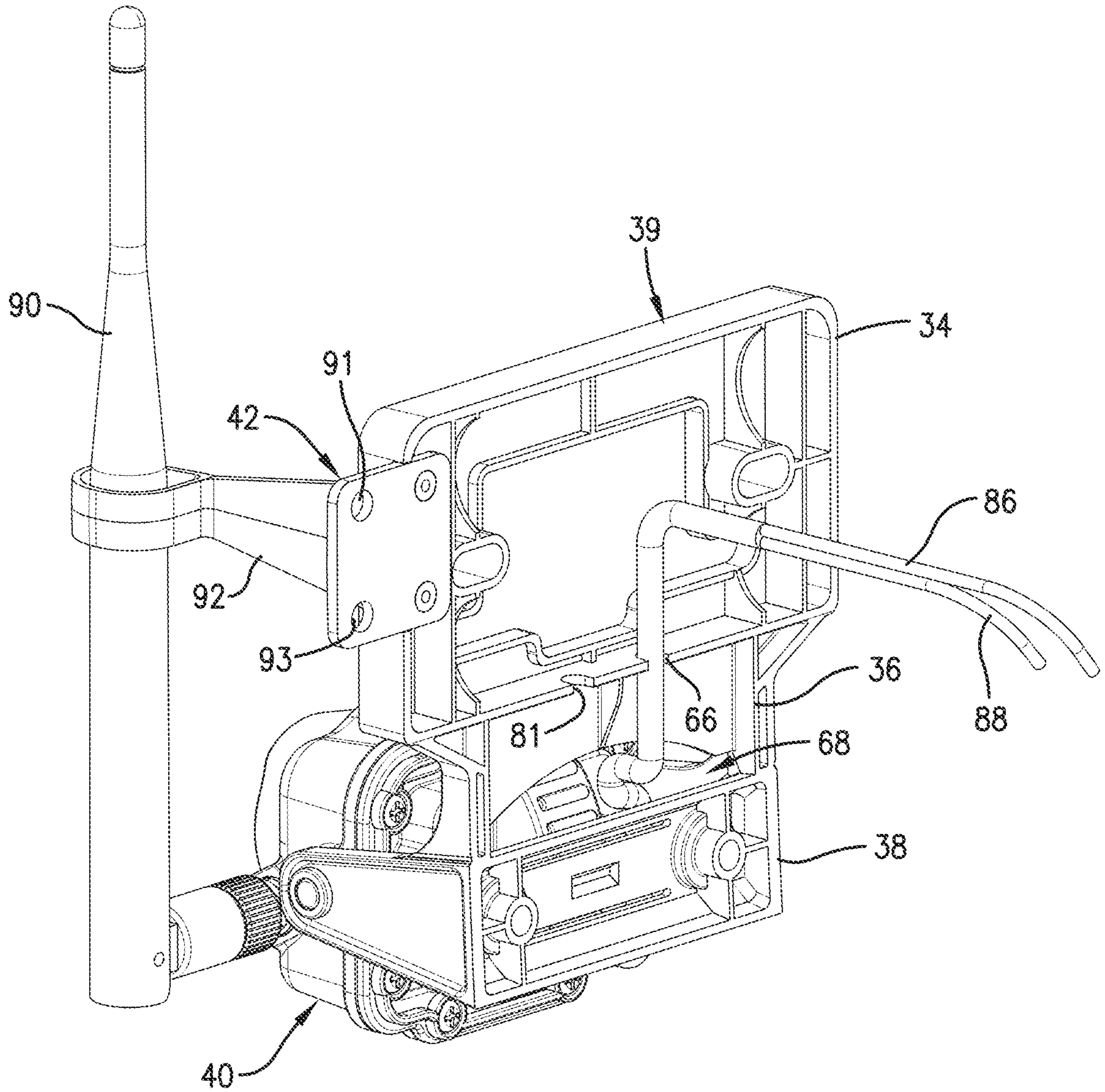
FIG. 5 is a rear perspective view of the camera device of FIG. 4.
Figure 6:
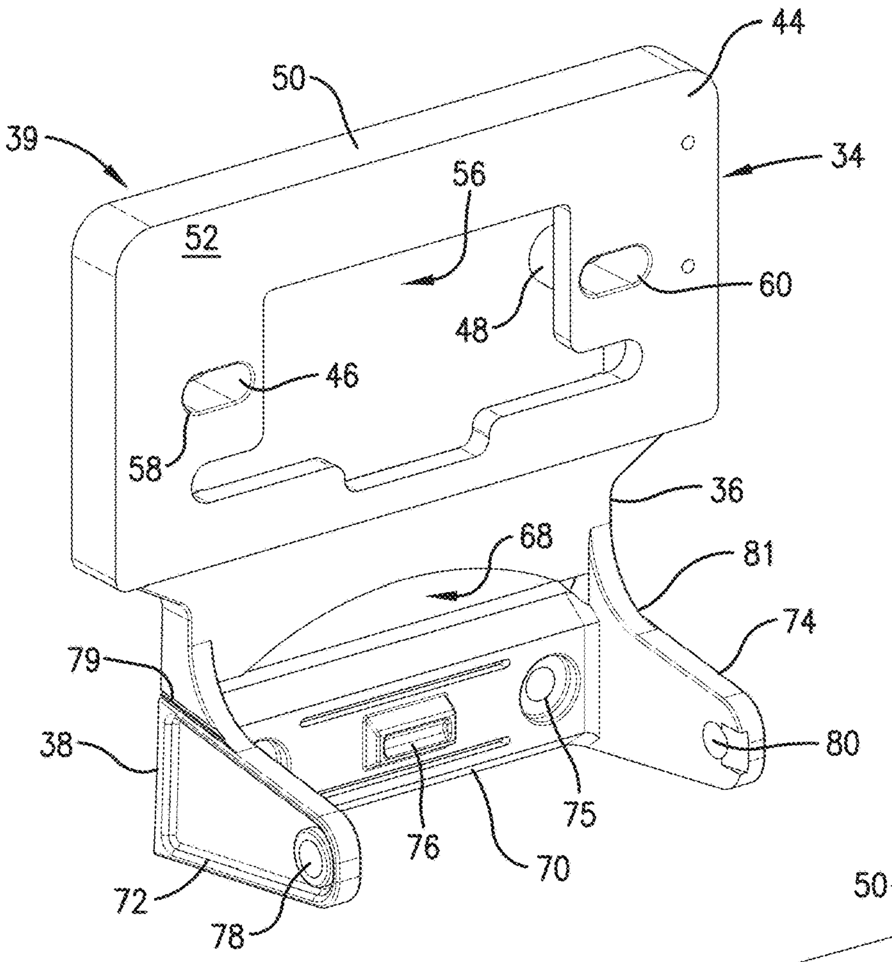
FIG. 6 is a front perspective view of a mount of the camera device of FIG. 4.
Figure 7:
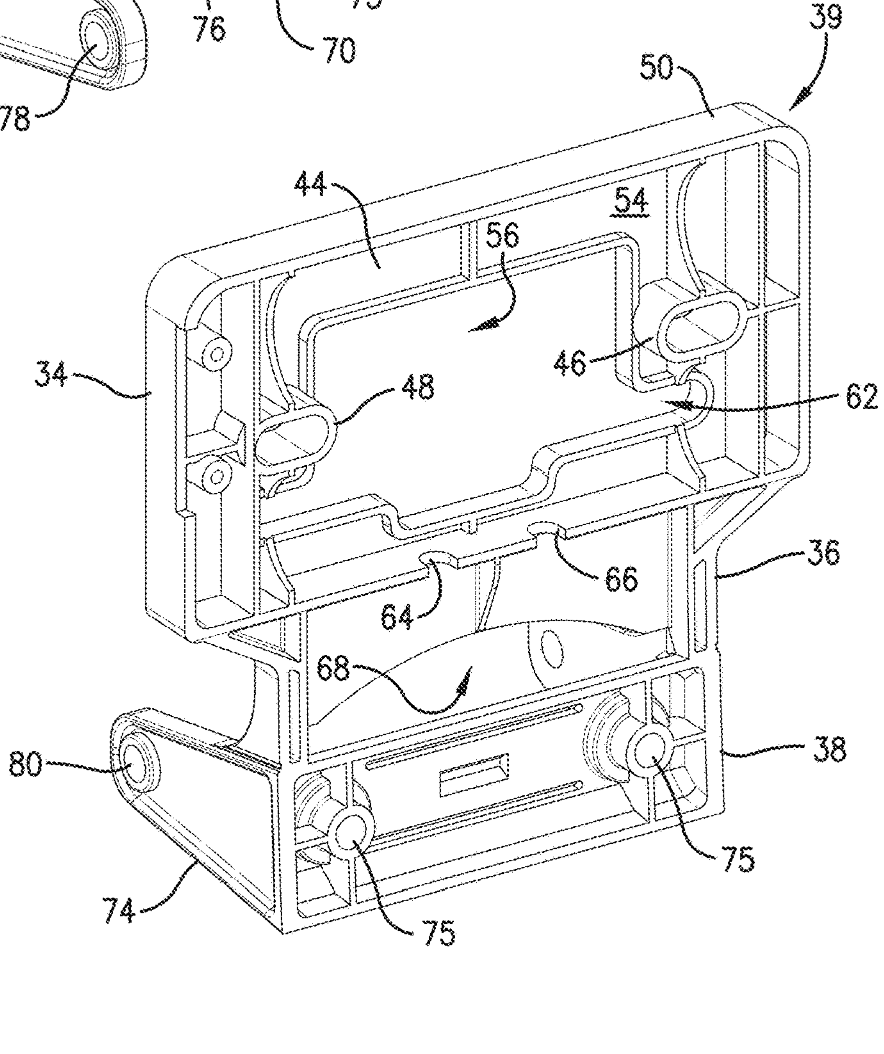
FIG. 7 is a rear perspective view of the mount of FIG. 6.
Figure 8:
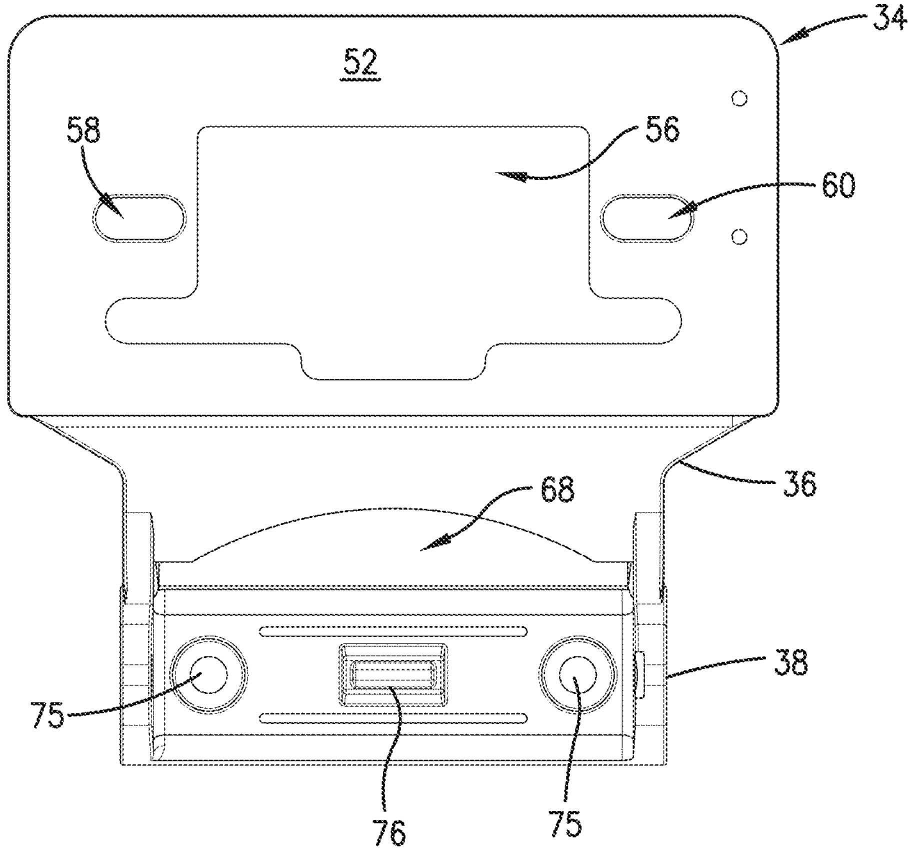
FIG. 8 is a front view of the mount of FIG. 6.

Turning to FIGS. 4 and 5, the camera device 10 comprises a mount 39 and a camera 40 removably attached to the mount 39. The mount 39 comprises a flange 34, a bottom portion 36, a bracket 38, and a side portion 42. The flange 34 is operable to be sandwiched between the light housing 18 and the support surface 12. The flange 34 may comprise a face plate 44, two or more guide walls 46, 48, and one or more exterior walls 50, as depicted in FIGS. 6-8.

The face plate 44 may comprise a front surface 52, a back surface 54 opposite to the front surface 52, a light housing hole 56, and two or more fastener holes 58, 60. The light housing hole 56 extends from the front surface 52 to the back surface 54 of the face plate 44. The two or more fastener holes 58, 60 may be located opposite to each across the light housing hole 56 and also extend from the front surface 52 to the back surface 54. The fastener holes 58, 60 may be elongated to facilitate installation with different types of light housings 18 having holes 22, 24 spaced apart at different distances.

The two or more guide walls 46, 48 guide the fasteners 26, 28 when the fasteners 26, 28 are inserted through the fastener holes 58, 60. The guide walls 46, 48 are in alignment with the fastener holes 58, 60 and extend generally perpendicularly from the back surface 54 of the face plate 44. The exterior walls 50 also extend generally perpendicularly from the back surface 54 and define a cavity 62 for storing one or more wires 30, 32 from the light housing 18 and/or one or more wires of the camera 40 (discussed in further detail below). The exterior walls 50 may include one or more notches 64, 66 for securing one or more wires of the camera 40, as shown in FIG. 7.

The bottom portion 36 connects the bracket 38 to the flange 34 and extends generally downwardly from the flange 34. The bottom portion 36 may be connected to the face plate 44 and/or the exterior walls 50. The bottom portion 36 may comprise a wire hole 68 for receiving one or more wire extending from the cavity 62, such as the wires of the camera 40.

Figure 16:
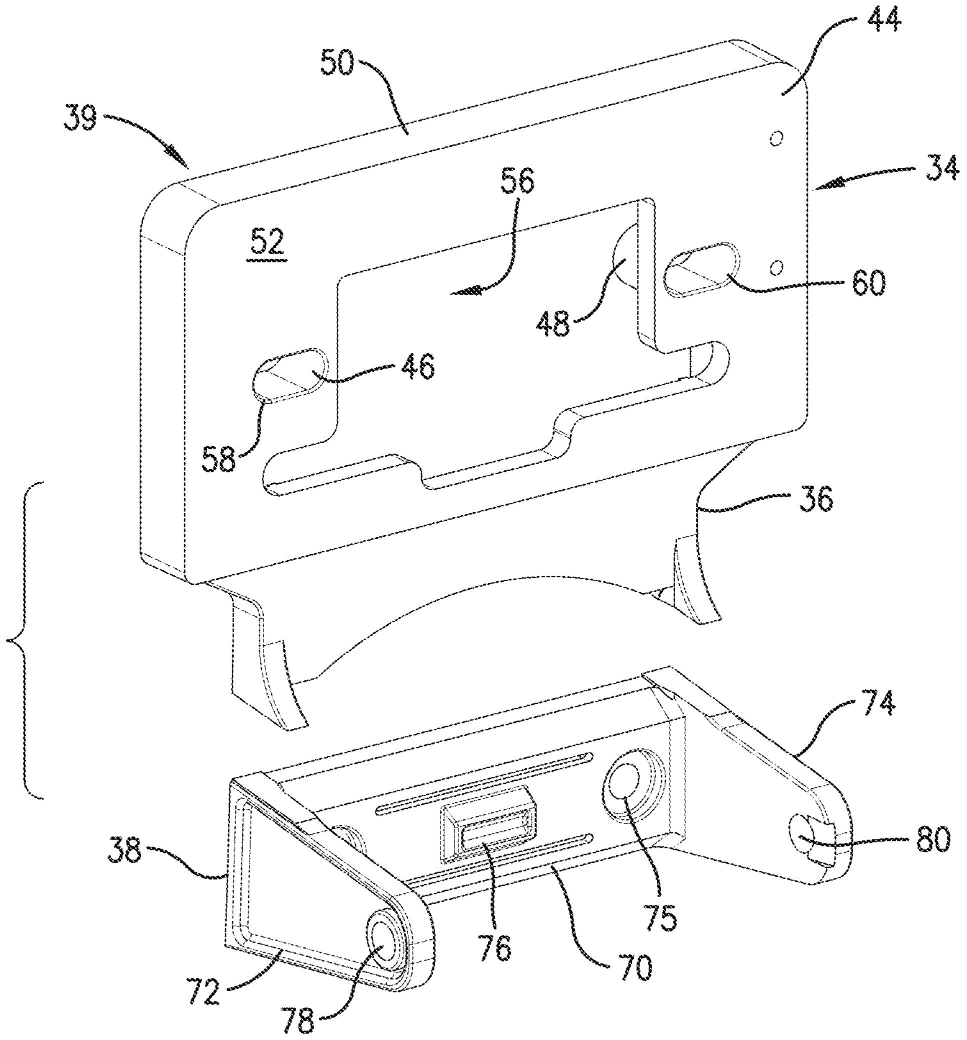
FIG. 16 is a perspective view of the camera device of FIG. 1 with the bracket detached from the rest of the mount.

The bracket 38 is configured to engage the camera 40 and may comprise a base 70 and a pair of protrusions 72, 74 connected to either end of the base 70. The base 70 may include an abutment 76 between the protrusions 72, 74 for abutting the camera 40 and preventing the camera 40 from pivoting beyond a certain angle downwards. The base 70 may also include one or more holes 75 for receiving a second fastener for securing the bracket 38 to the support surface 12. Each protrusion 72, 74 may extend generally perpendicularly from the base 70 and have camera shank holes 78, 80 at their distal ends for receiving shanks of the camera 40 (as discussed in further detail below). In some embodiments, the bracket 38 may be separable from the rest of the mount 39. For example, as depicted in FIG. 6, the bracket 38 may comprise separation grooves 79, 81 for breaking and/or cutting the bracket 38 away from the bottom portion 36. FIG. 16 depicts the bracket 38 broken away from the rest of the mount 39. The bracket 38 may be attachable and/or detachable from the bottom portion 36 using any device and in any manner without departing from the scope of the present invention.

Figure 9:
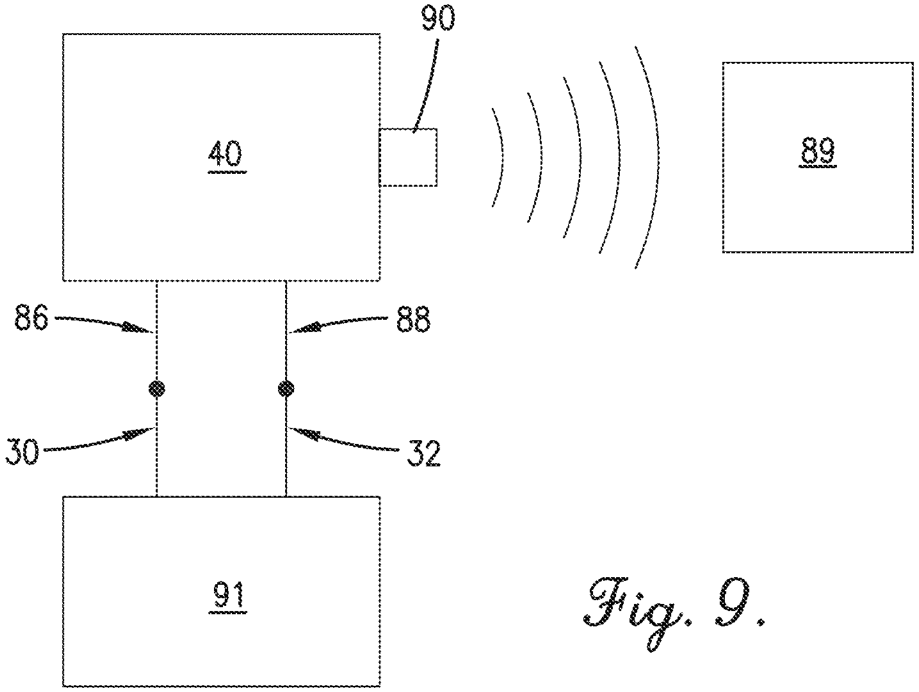
FIG. 9 is a schematic view of a camera of the camera device of FIG. 1 in communication with a display and power source.
Figure 10:
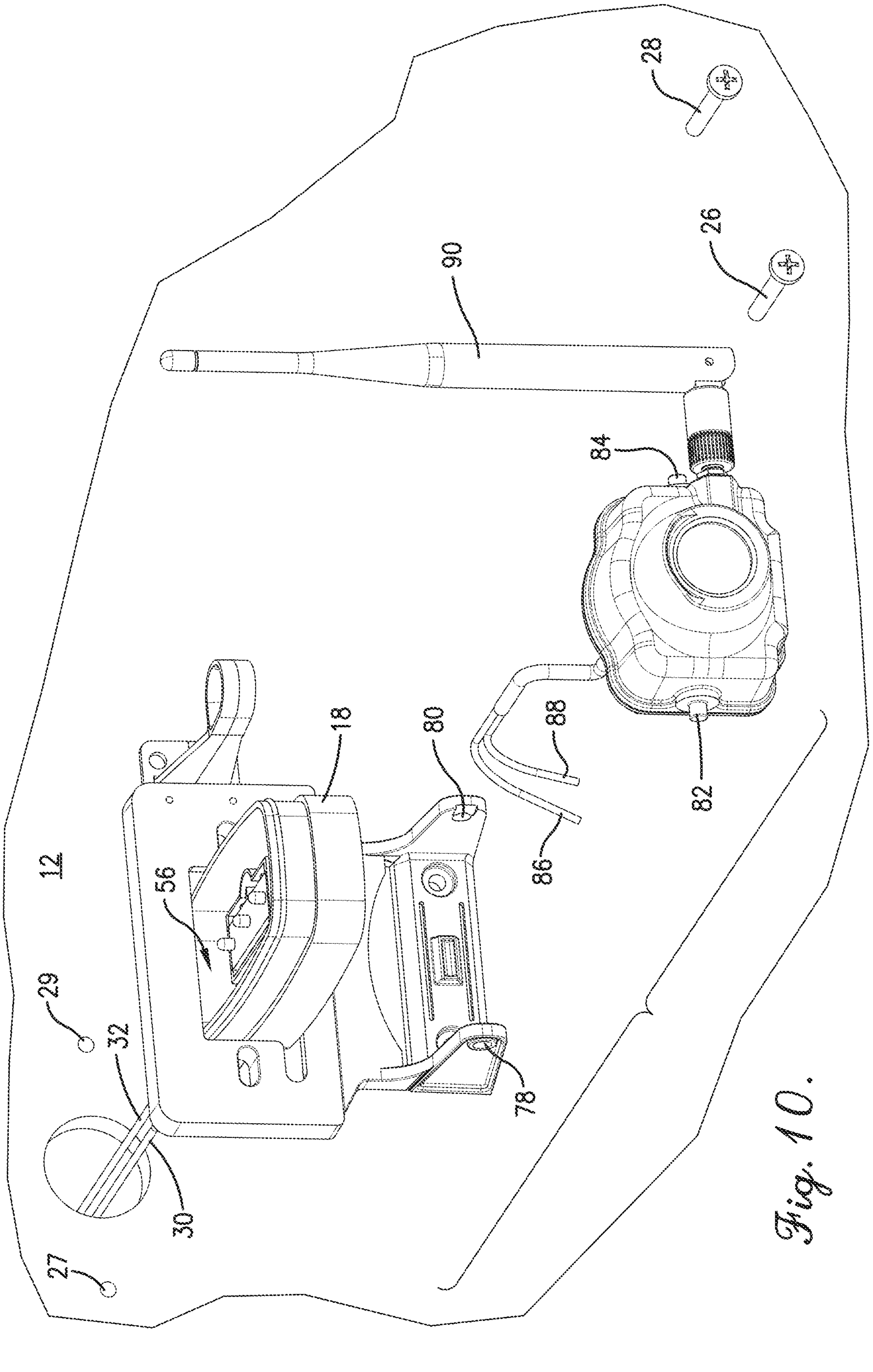
FIG. 10 is a perspective view of a light housing of the light passing through the mount of the camera device of FIG. 1.
Figure 11:
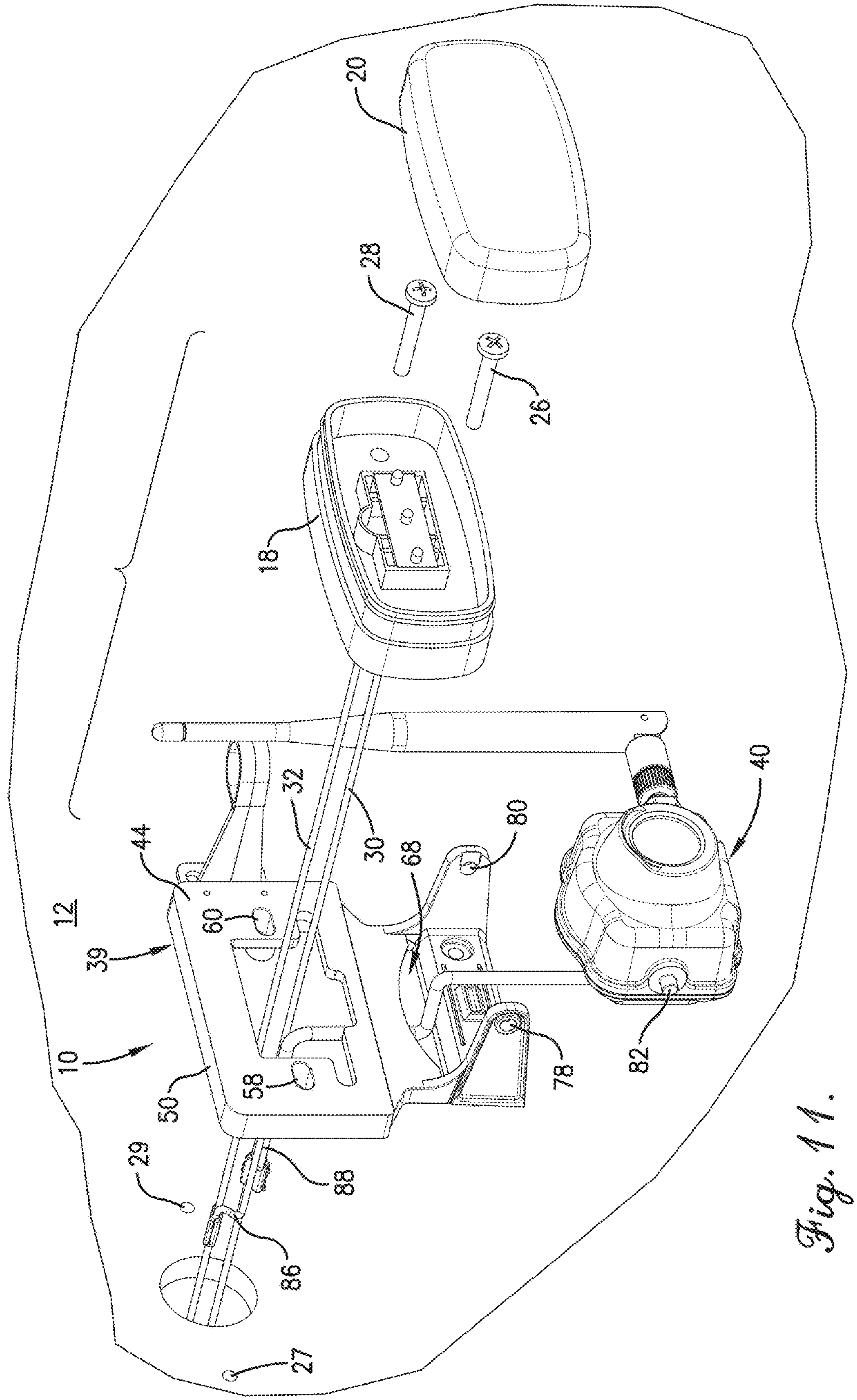
FIG. 11 is a perspective view of wires of the camera of the camera device of FIG. 1 connected to wires of the light.

Turning momentarily to FIG. 10, the camera 40 is operable to capture rearview images behind the trailer 14 and is supported on the bracket 38. The camera 40 may comprise a pair of shanks 82, 84 for inserting into the shank holes 78, 80 of the bracket 38 to enable the camera 40 to pivot about an axis intersecting the shank holes 78, 80. One or more wires 86, 88 may be connected to the camera 40 and extend into the cavity 62 and connect to the wires 30, 32 of the light 16, as depicted in FIG. 11. These wires 86, 88 may provide electricity to the camera 40, such as for charging the camera 40, providing a signal to the camera 40, powering the camera 40, or the like. The camera 40 may be configured to communicate with a display 89 via wired or wireless communication, as depicted in FIG. 9. In preferred embodiments, the camera 40 is a wireless camera having an antenna 90 for communicating with the display 89 and that receives power from a power source 91 via the wires 86, 88 spliced into the wires 30, 32 connected to the light housing 18. The power source 91 may be a vehicle battery, rectifier, alternator, etc. Additionally or alternatively, the camera 40 may be connected to a wireless transceiver configured to transmit images captured by the camera 40 to the display 89.

Turning back to FIG. 5, the side portion 42 supports the antenna 90 of the camera 40 and is adjacently attached to the flange 34. The side portion 42 may comprise an antenna support 92 extending generally horizontally relative to the flange 34 to engage the antenna 90. The side portion 42 may be removably attached to the flange 34 so that the mount 39 can support cameras 40 without antennas. The side portion 42 may comprise holes 91, 93 for receiving fasteners that secure the side portion 42 to the support surface 12.

An exemplary way of installing the camera device 10 is described herein. The camera device 10 may be installed by removing the face plate 20 of the light 16 to gain access to the fasteners 26, 28 securing the light housing 18 to the support surface 12, as depicted in FIG. 3. The fasteners 26, 28 are unfastened to unsecure the light housing 18 from the support surface 12. The wires 30, 32 connected to the light housing 18 may be spliced to connect to camera wires 86, 88 (as shown in FIG. 11). The camera wires 86, 88 may already be connected to the camera 40 and extend through the wire hole 68 of the bottom portion 36.

Figure 12:
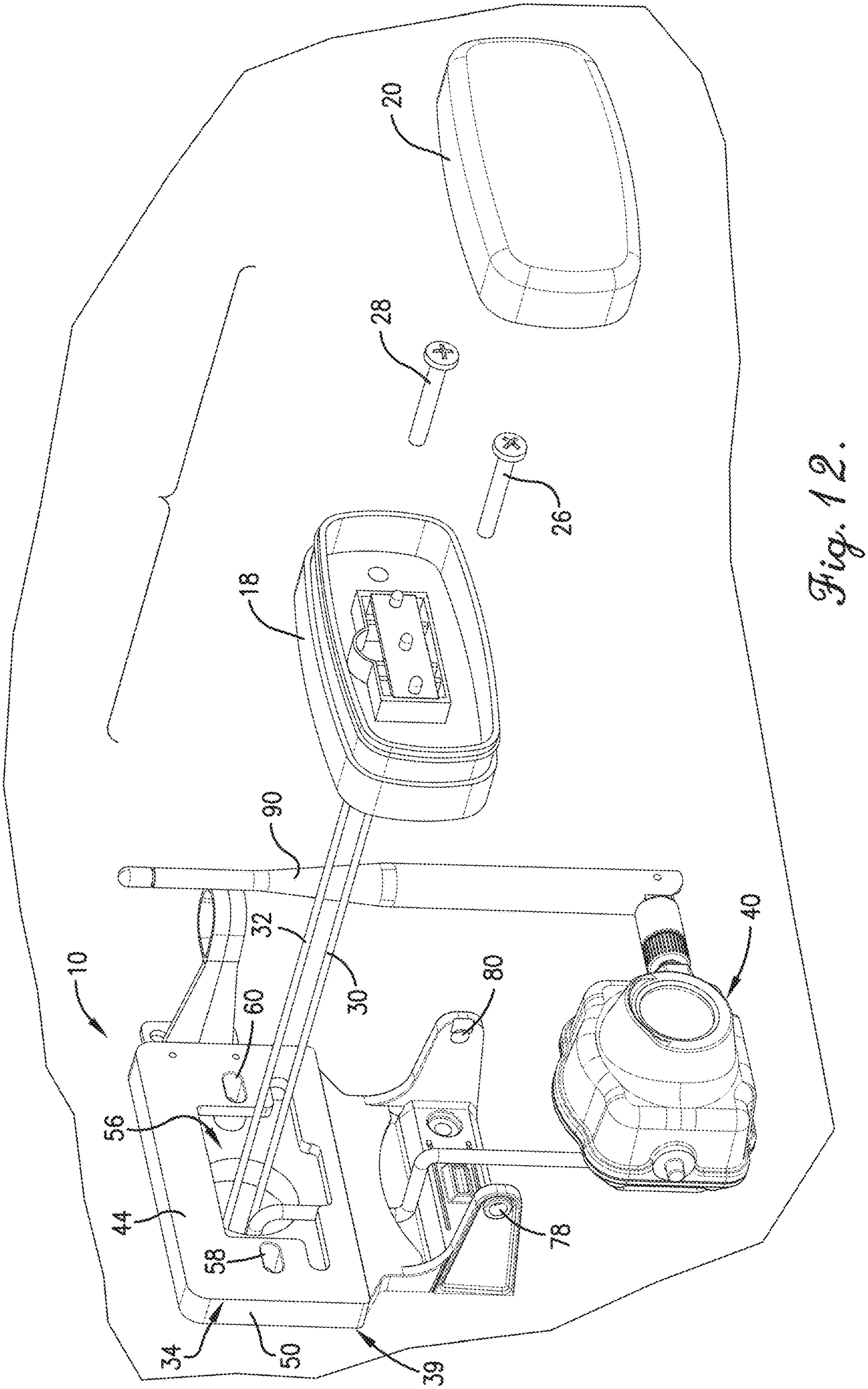
FIG. 12 is a perspective view of the mount of the camera device of FIG. 1 positioned on the support surface.
Figure 13:
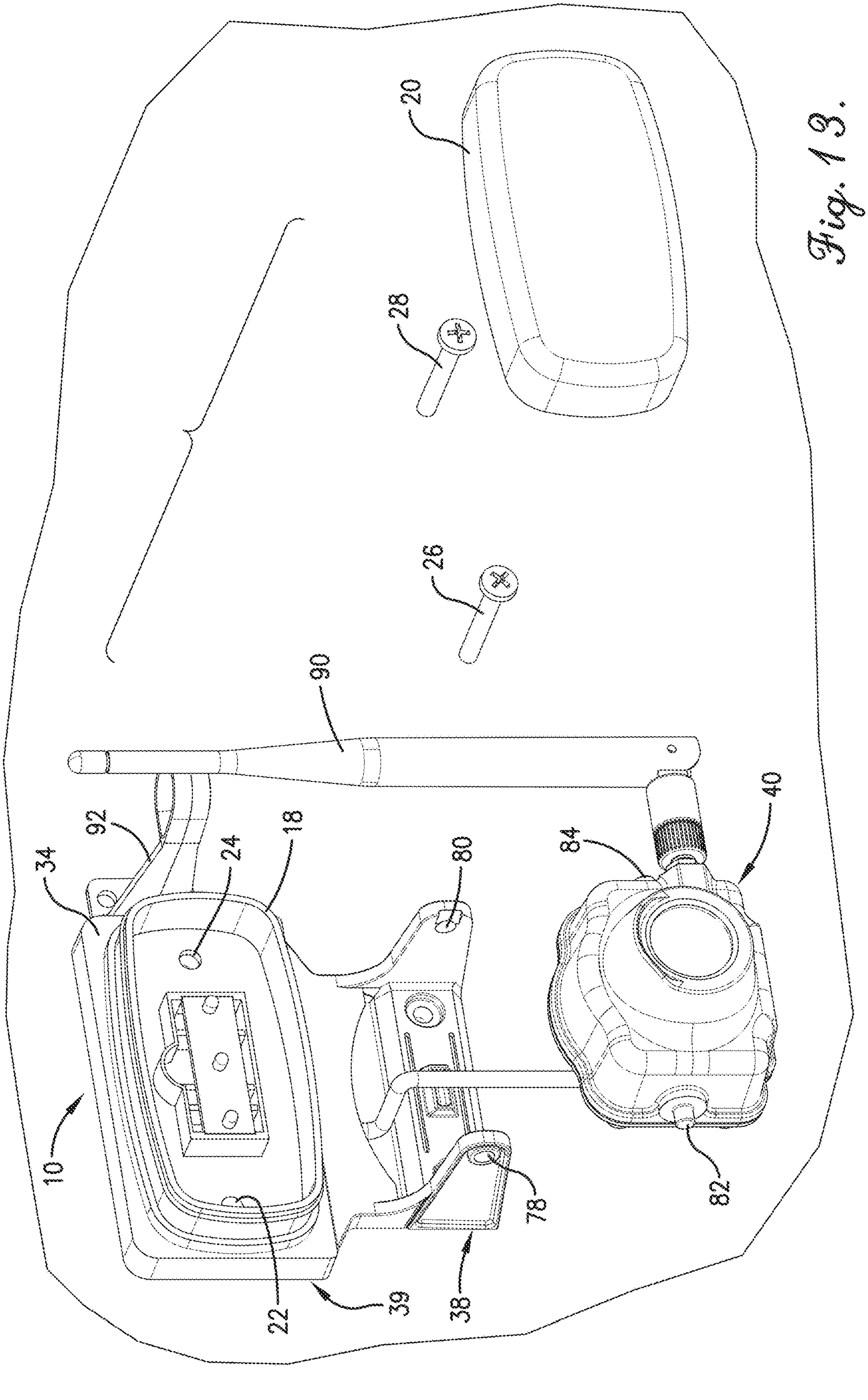
FIG. 13 is a perspective view of light housing positioned on the mount of the camera device of FIG. 1.

The mount 39 may be installed on the support surface 12 by pulling the light housing 18 through the light housing hole 56 (with the wires 30, 32 still connected), as depicted in FIG. 10. The flange 34 may then be placed on the support surface 12 with the exterior walls 50 abutting the support surface 12, as depicted in FIG. 12, thereby maintaining the cavity 62 between the face place 44 and the support surface 12. The wires 86, 88 connected to the camera 40 may be positioned in the notches 64, 66 (shown in FIG. 5) and extend into the cavity 62 to connect to the light wires 30, 32. The flange 34 may be positioned so that the two or more fastener holes 58, 60 of the face plate 44 are aligned with pre-existing holes 27, 29 in the support surface 12. Turning to FIG. 13, the light housing 18 may be placed on the front surface 52 of the face plate 44 with the holes 22, 24 of the light housing 18 being aligned with the fastener holes 58, 60 of the face plate 44. The fasteners 26, 28 may be inserted through the holes 22, 24 of the light housing 18, through the fastener holes 58, 60 of the face plate 44, and guide by the guide walls 46, 48 to the pre-existing holes in the support surface 12. The fasteners 26, 28 may be fastened to sandwich the flange 34 between the light housing 18 and the support surface 12, thereby securing the mount 39 to the support surface 12.

Figure 14:
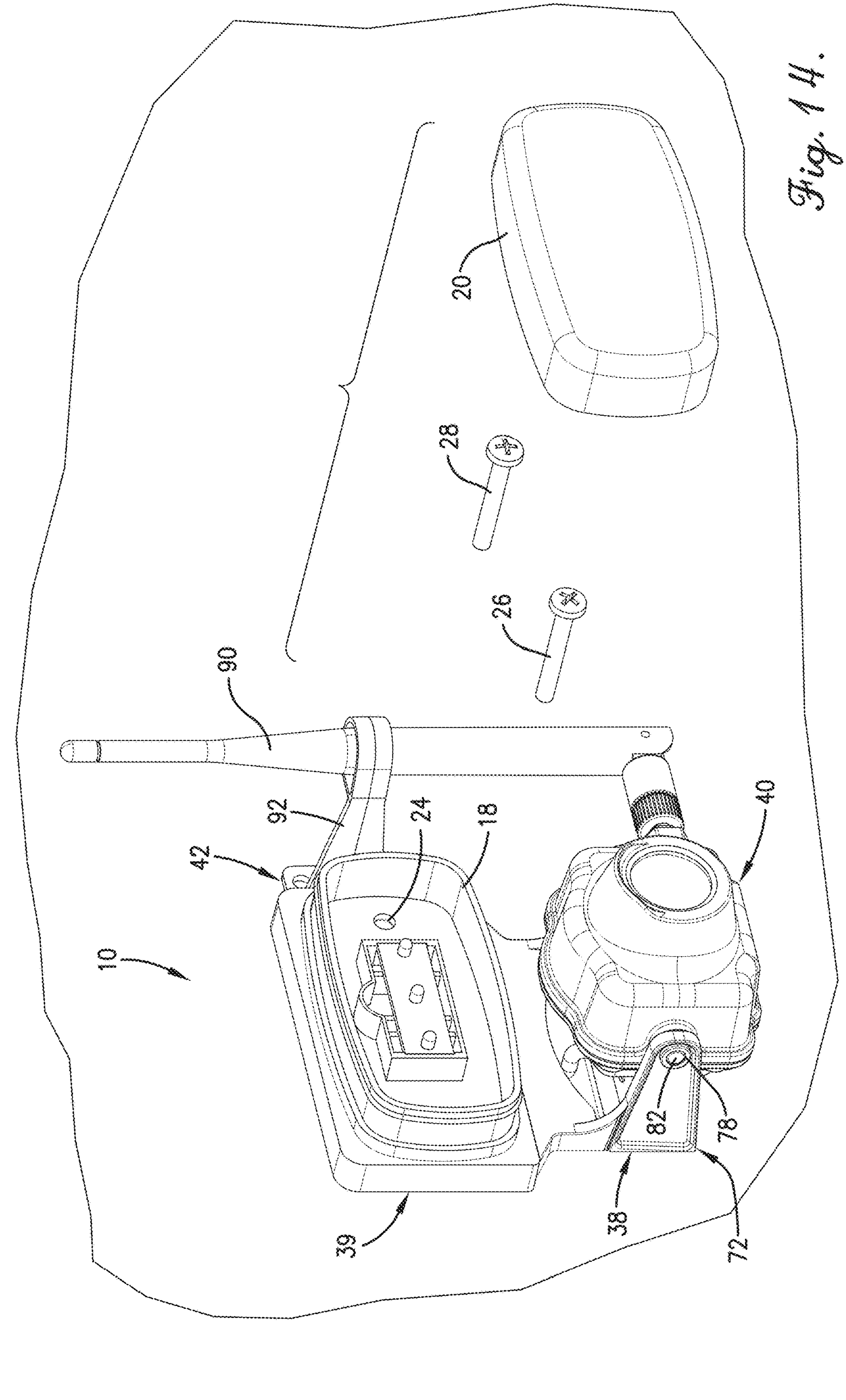
FIG. 14 is a perspective view of the camera device of FIG. 1 installed on the support surface of the trailer with a face plate of the light removed.

The camera 40 may be pivotally attached to the mount 39, as shown in FIG. 14. The shanks 82, 84 of the camera 40 may be inserted into the shank holes 78, 80 of the bracket 38. The camera 40 may be pivoted to a desired angle that provides the best rearward field of view. In some embodiments, the camera 40 may be pivoted until it abuts the abutment 76 of the base 70 of the bracket 38.

Figure 15:
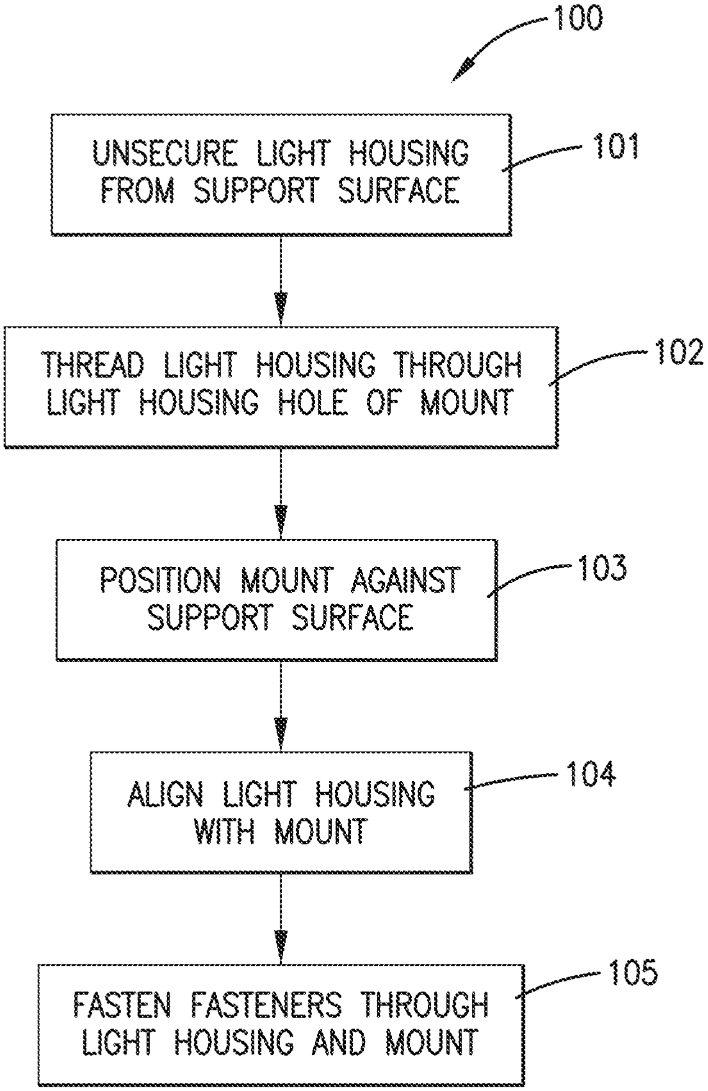
FIG. 15 is a flowchart illustrating a method of securing a mount to a trailer according to an embodiment of the present invention.

The flow chart of FIG. 15 depicts the steps of an exemplary method 100 of securing a mount to a support surface of a trailer or other towed vehicle. In some alternative implementations, the functions noted in the various blocks may occur out of the order depicted in FIG. 15. For example, two blocks shown in succession in FIG. 15 may in fact be executed substantially concurrently, or the blocks may sometimes be executed in the reverse order depending upon the functionality involved. In addition, some steps may be optional.

Referring to step 101, a light housing may be unsecured from the support surface of the trailer. A face plate removably attached to the light housing may be removed to gain access to fasteners inside the light housing and securing the light housing to the support surface. The fasteners may be unfastened and removed from the light housing. Light wires connected to the light housing may be spliced and connected to camera wires. The camera wires may be connected to a camera and extend through a wire hole of a bottom portion of the mount.

Referring to step 102, the light housing and a length of light wires extending from the light housing may be threaded through a light housing hole of the mount. The light housing hole of the mount enables the camera to be installed without having to disconnect any wires from the light housing. This reduces the complexity of the installation and obviates having to run wires through the trailer.

Referring to step 103, the mount may be positioned against the support surface. The flange of the mount may be placed on the support surface so that its exterior walls abut the support surface, thereby defining a cavity between a face place of the flange and the support surface. The camera wires may be positioned in notches on one of the exterior walls of the flange and extend through a hole in a bottom portion of the mount toward a bracket having a pair of protrusions for engaging the camera.

Referring to step 104, the light housing may be aligned with the mount so that one or more holes of the light housing is coaxial with one or more fastener holes of the mount. The flange may be positioned so that the fastener holes on the face plate are aligned with pre-existing holes in the support surface (the holes in which the light house fasteners were fastened prior to removal). The light housing may be placed on the front surface of the face plate with the holes of the light housing being aligned with the fastener holes of the face plate.

Referring to step 105, one or more fasteners may be fastened through the one or more holes of the light housing and the one or more fastener holes of the mount to secure the light housing and the mount to the support surface. The fasteners may be inserted through the holes of the light housing, through the fastener holes of the face plate, and guided by the guide walls to the pre-existing holes in the support surface. The fasteners may be fastened to sandwich the flange between the light housing and the support surface, thereby securing the mount to the support surface.

The method 100 may include additional, less, or alternate steps and/or device(s), including those discussed elsewhere herein. For example, the method 100 may include a step of attaching the camera. The camera may be pivotally attached to the mount via shanks of the camera, which may be inserted into shank holes in protrusions of the bracket. The camera may be pivoted to a desired angle that provides a desired rearward field of view. In some embodiments, the camera may be pivoted until it abuts an abutment at the base of the bracket.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. A device for attaching a camera to an existing light on a support surface of a towed vehicle without disconnecting wires from the existing light, the support surface having a support surface hole for receiving a fastener, the existing light having a light housing with a housing hole for receiving the fastener for securing the light housing to the support surface, the device comprising:

a flange for positioning between the support surface and the existing light, the flange comprising:

a light housing hole for receiving the light housing and the wires connected to the existing light therethrough, and a fastener hole capable of aligning with the housing hole of the existing light and the support surface hole for receiving the fastener to secure the light and the device to the support surface; and a bracket extending from the flange and configured to engage the camera.

2. The device of claim 1, wherein the flange comprises a face plate having a front surface and a back surface opposite the front surface, and one or more walls extending perpendicularly from the back surface and defining a cavity for accommodating wires extending from the support surface.

3. The device of claim 2, wherein the flange comprises a guide wall extending perpendicular from the back surface and in alignment with the fastener hole for guiding the fastener behind the face plate.

4. The device of claim 2, further comprising a bottom portion between the flange and the bracket, wherein the bottom portion includes a wire hole for receiving one or more wire from the cavity.

5. The device of claim 2, wherein the one or more walls comprise a pair of notches for holding wires extending from the cavity toward the bracket.

6. The device of claim 1, wherein the bracket comprises a pair of horizontally spaced protrusions configured to pivotally engage opposite ends of the camera so that when the protrusions engage the camera, the camera is operably to pivot about a horizontal axis.

7. The device of claim 6, wherein the protrusions of the bracket each include a shank hole for receiving a shank of the camera.

8. The device of claim 6, wherein the bracket comprises an abutment located between the protrusions and extending horizontally and configured to abut the camera when the camera is engaged so that the camera cannot pivot beyond a certain angle.

9. The device of claim 6, wherein the bracket includes a base extending between the protrusions and comprising a hole for receiving a second fastener for securing the bracket to the support surface.

10. The device of claim 1, further comprising a side portion adjacently attached to the flange and having a protrusion with an antenna support.

11. A mount for attaching a camera to an existing light on a support surface of a towed vehicle, the existing light being connected to one or more wires of the towed vehicle, the support surface having a support surface hole for receiving a fastener, the existing light having a light housing with a housing hole for receiving the fastener for securing the light housing to the support surface, the mount comprising:

a flange for positioning between the support surface and the existing light, the flange comprising:

a light housing hole for receiving the light housing and the one or more wires connected to the existing light therethrough, a fastener hole capable of aligning with the housing hole of the existing light and the support surface hole for receiving the fastener to secure the light and the mount to the support surface, and a notch configured to engage one or more camera wire;

a bracket operatively associated with the flange and configured to engage the camera; and a wire hole located between the bracket and the flange and sized to receive the one or more camera wire.

12. The mount of claim 11, wherein the notch is a first notch, and the flange includes a second notch spaced apart from the first notch.

13. The mount of claim 11, wherein the notch is located on a side of the flange that faces the support surface when secured to the support surface.

14. The mount of claim 11, wherein the bracket is operatively associated with the flange via a connector portion, and the wire hole extends through the connector portion.

15. The mount of claim 14, wherein the bracket is configured to be detached from the connector portion.

16. The mount of claim 15, wherein the bracket includes one or more holes for receiving a fastener to secure the bracket to the support surface.

17. A kit for installing on an existing light on a support surface of a towed vehicle, the existing light being connected to one or more wires of the towed vehicle, the support surface having a support surface hole for receiving a fastener, the existing light having a light housing with a housing hole for receiving the fastener for securing the light housing to the support surface, the kit comprising:

a mount for placing between the existing light and the support surface, the mount comprising:

a flange for positioning between the support surface and the existing light, the flange comprising:

a light housing hole for receiving the light housing and the one or more wires connected to the existing light therethrough, and a fastener hole capable of aligning with the housing hole of the existing light and the support surface hole for receiving the fastener to secure the light and the mount to the support surface;

a bracket operatively associated with the flange; and a camera configured to be secured to the bracket of the mount.

18. The kit of claim 17, wherein the bracket is configured to be detached from a remainder of the mount.

19. The kit of claim 18, wherein the bracket includes a hole for receiving a fastener for securing the bracket to the support surface.

20. The kit of claim 17, wherein the flange includes one or more notches configured to engage one or more wires.

* * * * *